United States Patent
Kaneko et al.

(10) Patent No.: US 10,367,388 B2
(45) Date of Patent: Jul. 30, 2019

(54) MAIN MOTOR FOR RAILWAY VEHICLE

(75) Inventors: Kenta Kaneko, Tokyo (JP); Haruyuki Kometani, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 421 days.

(21) Appl. No.: 14/346,239

(22) PCT Filed: Sep. 30, 2011

(86) PCT No.: PCT/JP2011/072642
§ 371 (c)(1),
(2), (4) Date: Mar. 20, 2014

(87) PCT Pub. No.: WO2013/046459
PCT Pub. Date: Apr. 4, 2013

(65) Prior Publication Data
US 2014/0319952 A1  Oct. 30, 2014

(51) Int. Cl.
*H02K 3/38* (2006.01)
*H02K 3/12* (2006.01)
(Continued)

(52) U.S. Cl.
CPC ............... *H02K 3/28* (2013.01); *H02K 3/12* (2013.01); *H02K 3/38* (2013.01); *H02K 2203/09* (2013.01); *H02P 25/22* (2013.01); *Y02T 10/641* (2013.01)

(58) Field of Classification Search
CPC .. H02K 3/00; H02K 3/04; H02K 3/12; H02K 3/28; H02K 17/00; H02K 17/02;
(Continued)

(56) References Cited

U.S. PATENT DOCUMENTS

| 2,778,962 A | 1/1957 | Taylor |
| 5,041,749 A * | 8/1991 | Gaser .................... H02K 21/16 |
| | | 310/156.22 |

(Continued)

FOREIGN PATENT DOCUMENTS

| JP | 2000-350396 A | 12/2000 |
| JP | 3578939 | 10/2004 |

(Continued)

OTHER PUBLICATIONS

The extended European Search Report dated Oct. 21, 2015, by the European Patent Office in corresponding European Patent Application No. 11873200.7-1809. (6 pages).

(Continued)

*Primary Examiner* — Quyen P Leung
*Assistant Examiner* — Minki Chang
(74) *Attorney, Agent, or Firm* — Buchanan Ingersoll & Rooney PC

(57) ABSTRACT

The main motor for a railway vehicle is rotationally driven upon receiving an AC power supplied from an inverter circuit that includes a switching element formed by using a wide bandgap semiconductor. The inverter circuit applies a voltage having a PWM waveform to the main motor for a railway vehicle in at least part of a speed range of an electric vehicle. The stator of the main motor for a railway vehicle is configured to include an annular stator core provided with a plurality of slots in a circumferential direction and coils that are wound on the stator core and are accommodated in the slots, and includes a stator winding that is three-phase star-connected and is composed of parallel circuits the number of which is the same as the number of poles for each phase.

8 Claims, 8 Drawing Sheets

(51) Int. Cl.
*H02K 3/28* (2006.01)
*H02P 25/22* (2006.01)

(58) Field of Classification Search
CPC .... H02K 17/12; H02K 17/14; H02K 2203/09; Y02T 10/641; H02P 25/22
USPC .......................... 310/159, 161, 179, 195, 198
See application file for complete search history.

(56) References Cited

U.S. PATENT DOCUMENTS

| | | | |
|---|---|---|---|
| 7,863,794 B2 | 1/2011 | Fujita et al. | |
| 8,405,341 B2 | 3/2013 | Tagome | |
| 8,489,262 B2 | 7/2013 | Yamasaki | |
| 2010/0277029 A1* | 11/2010 | Fujita | H02K 3/28 310/208 |
| 2010/0328975 A1* | 12/2010 | Hibino | H02M 7/003 363/126 |
| 2011/0101906 A1 | 5/2011 | Tagome | |
| 2011/0278995 A1* | 11/2011 | Akutsu | B62D 5/0403 310/68 D |
| 2011/0298311 A1* | 12/2011 | Sagara | H02K 3/522 310/43 |
| 2012/0037436 A1* | 2/2012 | Kwon | H02K 3/50 180/65.1 |

FOREIGN PATENT DOCUMENTS

| | | | | | |
|---|---|---|---|---|---|
| JP | 2009-219268 A | | 9/2009 | | |
| JP | 2010-119231 A | | 5/2010 | | |
| JP | 2010-259326 A | | 11/2010 | | |
| JP | 2010259326 A | * | 11/2010 | | |
| JP | 2011-182512 A | | 9/2011 | | |
| JP | 2011182512 A | * | 9/2011 | | |
| JP | WO 2011108736 A1 | * | 9/2011 | | H02K 1/278 |
| JP | WO 2011151692 A2 | * | 12/2011 | | H02K 3/522 |
| KR | 10-2010-0122949 A | | 11/2010 | | |
| WO | WO 2008/107992 A1 | | 9/2008 | | |
| WO | 2011/108736 A1 | | 9/2011 | | |

OTHER PUBLICATIONS

Office Action dated Dec. 1, 2014, by the Australian Patent Office in corresponding Australian Patent Application No. 2011377670. (3 pages).

Japanese Office Action dated Jun. 3, 2014 issued in corresponding Japanese Patent Appln. No. 2013-535797, with English translation (4 pages).

International Search Report (PCT/ISA/210) dated Nov. 8, 2011, by the Japanese Patent Office as the International Searching Authority for International Application No. PCT/JP2011/072642.

Written Opinion (PCT/ISA/237) dated Nov. 8, 2011, by the Japanese Patent Office as the International Searching Authority for International Application No. PCT/JP2011/072642.

Office Action (Notice of Preliminary Rejection) dated Sep. 7, 2015, by the Korean Intellectual Property Office in corresponding Korean Patent Application No. 10-2014-7010922, and an English Translation of the Office Action. (8 pages).

Office Action (Communication pursuant to Article 94(3) EPC) dated Aug. 10, 2016, by the European Patent Office in corresponding European Patent Application No. 11 873 200.7-1809. (7 pages).

Communication pursuant to Article 94(3) EPC dated Mar. 1, 2017, by the European Patent Office in corresponding European Patent Application No. 11 873 200.7-1809. (6 pages).

* cited by examiner

FIG.10
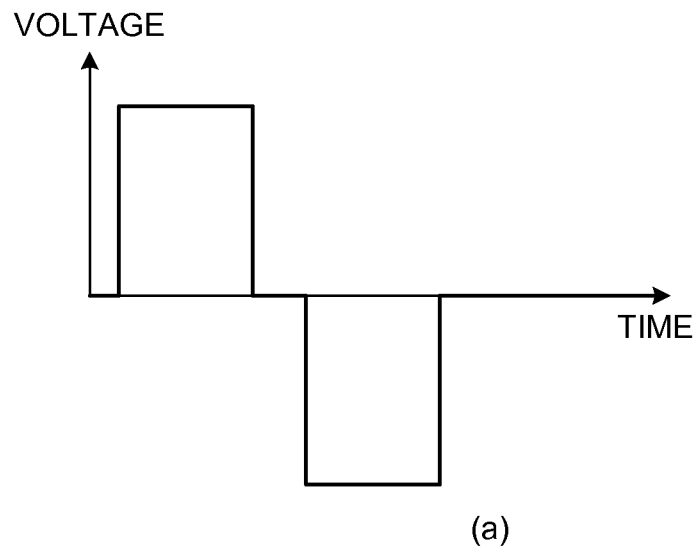
(a)
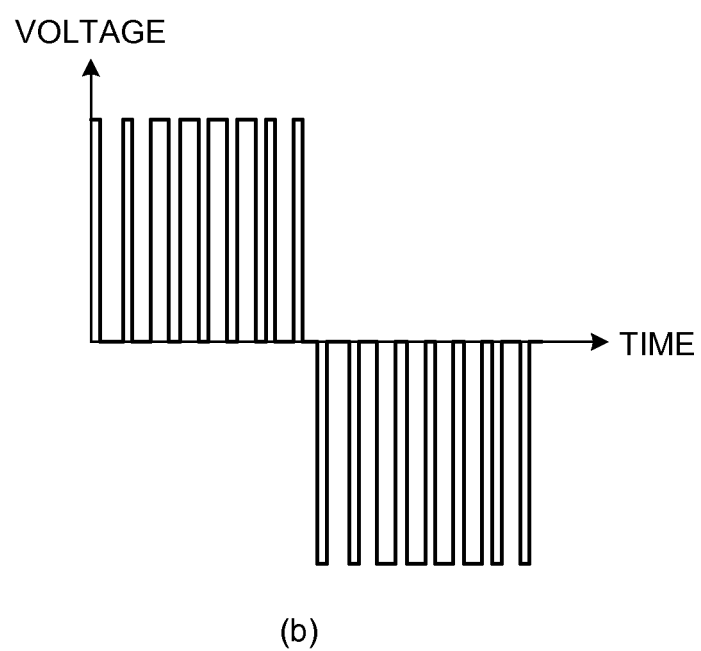
(b)

MAIN MOTOR FOR RAILWAY VEHICLE

FIELD

The present invention relates to a main motor for a railway vehicle.

BACKGROUND

Typically, electric vehicles convert the power collected from an overhead wire into three-phase AC power by an inverter circuit and drive main motors by supplying this AC power to the main motors, thereby obtaining a propulsion force. For example, in the case of a DC overhead wire, the typical configuration is such that the DC power supplied from the overhead wire is converted into variable-voltage variable-frequency AC power by an inverter circuit and the main motor is driven by using this AC power. Moreover, in the case of an AC overhead wire, the typical configuration is such that the AC power supplied from the overhead wire is converted once into DC power by a converter circuit, this DC power is further converted into variable-voltage variable-frequency AC power by an inverter circuit, and the main motor is driven by using this AC power.

Moreover, in the control of the main motor for a railway vehicle, in order to minimize the switching loss of the inverter circuit, a one-pulse mode, in which a rectangular wave voltage is output by switching only twice over an electrical angle of 360° of the AC-voltage-command fundamental wave and the voltage to be output to the main motor is fixed to a maximum voltage, is used in accordance with the speed range (for example, see Patent Literature 1).

On the other hand, a main motor is composed of a stator and a rotor. The circuit configuration of a stator winding is typically related to the losses in the main motor. For example, when the stator winding is composed of parallel circuits, it is known that a circulating current is generated in the stator winding depending on the relationship between the number of parallel circuits and the number of poles (for example, see Patent Literature 2).

CITATION LIST

Patent Literature

Patent Literature 1: WO2008/107992
Patent Literature 2: Japanese Patent No. 3578939

SUMMARY

Technical Problem

As described above, in the control of the main motor for a railway vehicle, in some cases, a synchronous one-pulse waveform is used as a voltage waveform to be output to the main motor. However, a one-pulse waveform includes a large number of low-order harmonic components and there is a problem in that the losses in the main motor increase due to these low-order harmonic components.

A typical known method of reducing such low-order harmonic components is to form a voltage waveform to be output to the main motor into a PWM waveform obtained by pulse-width modulating the voltage waveform. However, when the voltage waveform is formed into a PWM waveform, there is a problem in that the inverter loss increases compared with the case of using a one-pulse waveform.

Moreover, as described above, when the stator winding is composed of parallel circuits, a circulating current is generated in the stator winding and the efficiency of the main motor decreases depending on the circuit configuration of the stator winding and the number of poles. Therefore, in order to improve the efficiency of the main motor, it is necessary to suppress a circulating current by appropriately selecting the circuit configuration of the stator winding.

The present invention has been achieved in view of the above and an object of the present invention is to provide a main motor for a railway vehicle in which low-order harmonic components included in an applied voltage are reduced, the switching loss of an inverter circuit is suppressed, and generation of a circulating current in a stator winding is suppressed.

Solution to Problem

In order to solve the above problems and achieve the object, a main motor for a railway vehicle according to the present invention is a three-phase AC main motor for a railway vehicle that is mounted on an electric vehicle and is used for driving the electric vehicle, is rotationally driven upon receiving an AC power supplied from an inverter circuit that includes a switching element formed by using a wide bandgap semiconductor, and is driven by having a voltage having a PWM waveform applied from the inverter circuit in at least part of a speed range of the electric vehicle, including a stator that is configured to include an annular stator core provided with a plurality of slots in a circumferential direction and coils that are wound on the stator core and are accommodated in the slots, and that includes a stator winding that is three-phase star-connected and is composed of parallel circuits number of which is same as number of poles for each phase; and a rotor that is arranged on an inner side of the stator core.

Advantageous Effects of Invention

According to the present invention, an effect is obtained where it is possible to provide a main motor for a railway vehicle in which low-order harmonic components included in an applied voltage are reduced, the switching loss of an inverter circuit is suppressed, and generation of a circulating current in a stator winding is suppressed.

BRIEF DESCRIPTION OF DRAWINGS

FIG. 10 is a diagram illustrating an example of a one-pulse waveform and a PWM waveform.

DESCRIPTION OF EMBODIMENTS

Figure 1:
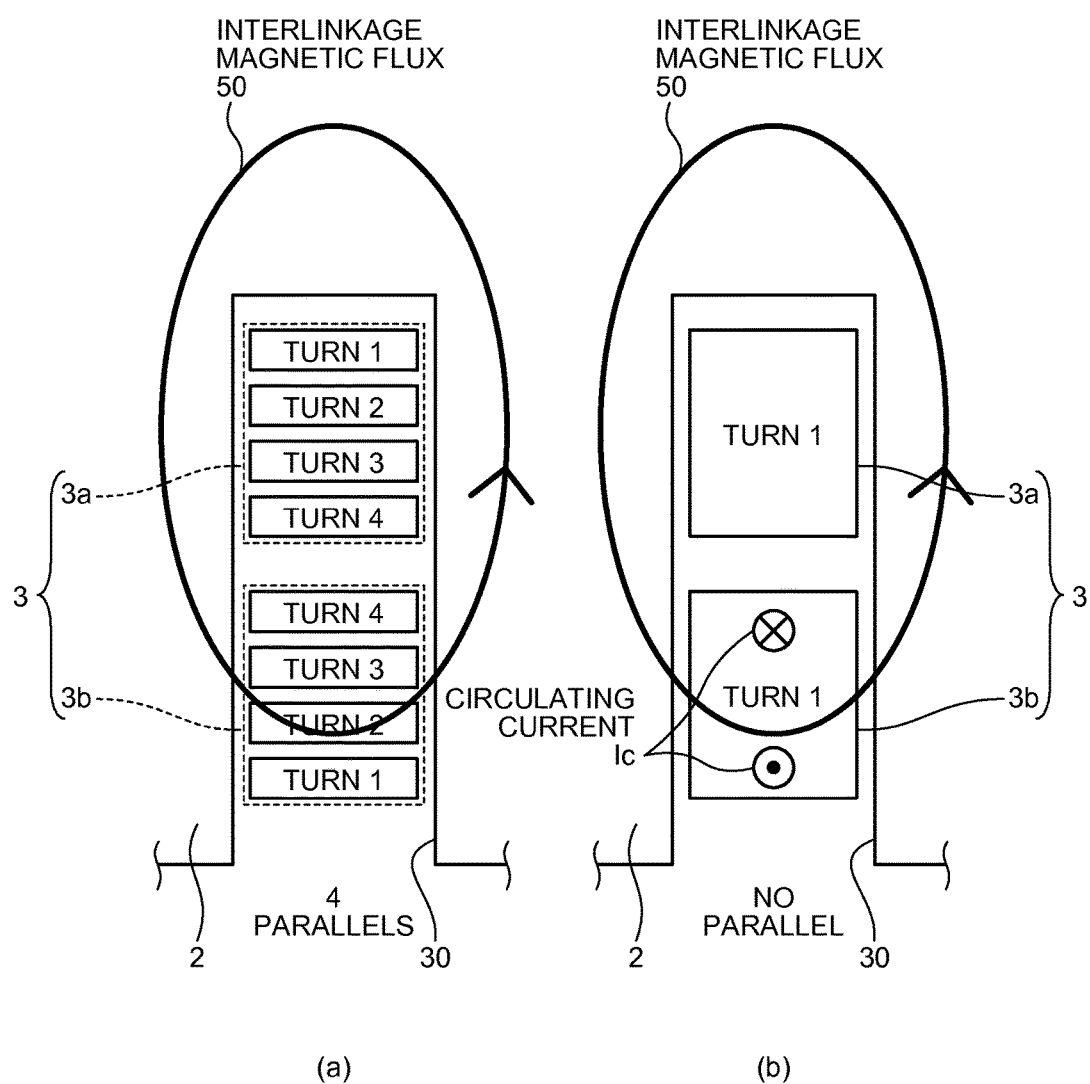
FIG. 1 is a diagram illustrating, by way of contrasting with each other, a case (a) where the stator winding is composed of four parallel circuits and a case (b) where the stator winding is not composed of parallel circuits.

Exemplary embodiments of a main motor for a railway vehicle according to the present invention will be explained below in detail with reference to the drawings. This invention is not limited to the embodiments.

Embodiment.

A main motor for a railway vehicle according to the present invention (hereinafter, simply referred to as a "main motor") is a motor that is mounted on an electric vehicle and is used for driving the vehicle. The main motor is a three-phase AC motor and is, for example, an induction motor. However, the main motor may be a motor other than an induction motor as long as it includes a configuration the same as a stator, which will be explained below, and can be, for example, a synchronous motor.

In electric vehicles, typically, the power collected from an overhead wire is converted into three-phase AC power by an inverter circuit and this AC power is supplied to the main motor. When the overhead wire is a DC overhead wire, the DC power supplied from the overhead wire is converted into variable-voltage variable-frequency AC power by an inverter circuit and this AC power is supplied to the main motor. Moreover, when the overhead wire is an AC overhead wire, the AC power supplied from the overhead wire is converted once into DC power by a converter circuit, this DC power is further converted into variable-voltage variable-frequency AC power by an inverter circuit, and this AC power is supplied to the main motor. In either case, the inverter circuit converts DC power from the DC power supply unit into AC power and the main motor is rotationally driven upon receiving the AC power supplied from the inverter circuit.

The output capacity of the main motor is substantially proportional to the product of the current and voltage applied to the main motor; therefore, for example, when the applied current is reduced, in order to obtain the same output capacity, it is necessary to increase the applied voltage. Moreover, the switching loss of the inverter circuit is reduced as the output current becomes smaller. Therefore, in the control of the main motor, in order to minimize the switching loss of the inverter circuit under the overhead voltage of a defined magnitude, in some cases, control is performed such that the voltage to be applied to the main motor is maximum. In other words, a waveform that is called a synchronous one-pulse waveform is used in some cases as a voltage waveform to be applied to the main motor. The one-pulse waveform is a waveform that is energized for a section of an electrical angle of 120° in a motor terminal voltage (see FIG. 10($a$)) and provides the maximum voltage that can be output to the main motor.

However, when a one-pulse waveform is subjected to frequency analysis, it is found that a one-pulse waveform is a waveform in which the ratio of low-order harmonics is large, for example, a fifth harmonic is 20% and a seventh harmonic is 14% with respect to the fundamental wave of 100%. Because harmonic components cause losses in the main motor, if the ratio of the low-order harmonics is large, the losses in the main motor increase. In other words, because the harmonic current is represented by harmonic voltage/impedance, in a case where the voltage waveform is a one-pulse waveform, the harmonic current increases because the ratio of the low-order harmonics is large.

A typical known method of reducing such a low-order harmonic voltage is to form a voltage waveform to be output to the main motor into a PWM waveform (see FIG. 10($b$)) that is obtained by pulse-width modulating the voltage waveform. However, when the voltage waveform is formed into a PWM waveform, the fundamental wave voltage thereof becomes lower than the case of a one-pulse waveform and thus the fundamental wave current thereof becomes larger than the case of a one-pulse waveform; therefore, there is a problem in that the switching loss of the inverter increases.

Accordingly, in the present embodiment, an inverter circuit that includes switching elements formed by using a wide bandgap semiconductor is used for the main motor. A wide bandgap semiconductor is a semiconductor that has a larger bandgap than silicon and is, for example, SiC (silicon carbide), GaN (gallium nitride), or diamond. Because the power loss of a wide bandgap semiconductor is low, the efficiency of the switching elements can be increased. Moreover, a wide bandgap semiconductor has a high withstand voltage and has a high allowable current density; therefore, the switching elements can be reduced in size. Moreover, a wide bandgap semiconductor has a high heat resistance; therefore, a heat dissipation fin of a heat sink can also be reduced in size. When the inverter circuit obtained by using such a wide bandgap semiconductor is used in the main motor, there is an advantage in that, even if a large current flows, the switching loss is reduced compared with the case where a conventional inverter circuit is used (for example, see Japanese Patent Application Laid-open No. 2011-078296). In other words, with the inverter circuit obtained by using a wide bandgap semiconductor, the switching loss of the inverter circuit is low; therefore, it is possible to provide a specification in which a large current is caused to flow in the main motor. Accordingly, in this case, under the overhead voltage of a defined magnitude, it is possible to use a PWM waveform having a specification with a low voltage and a large current without using a one-pulse waveform in which the voltage is maximized, which is the case with the conventional technology. Thus, it is possible to cause the voltage waveform to approximate to a sine wave; therefore, the loss in the main motor due to low-order harmonics can be reduced. Accordingly, it is possible to achieve both improvement of the efficiency of the main motor and reduction of the switching loss of the inverter circuit.

Next, an explanation will be made of the stator winding of the main motor in the present embodiment. As described above, in the present embodiment, because the PWM control is mainly used for controlling the inverter circuit, a large current flows in the main motor compared with the case of using a one-pulse mode. In this case, it is effective that the stator winding is composed of a plurality of parallel windings and the current flowing in each parallel winding is reduced. In other words, in the present embodiment, the stator winding is composed of parallel circuits. In the following, the reason for this will be explained. Hereinafter, each of the winding circuits parallel to each other is referred to as a parallel circuit. Moreover, the number of parallel circuits indicates the number of winding circuits that are parallel to each other. Moreover, n in a case of n parallel circuits means the number of parallel circuits.

It is assumed here that the example is a case where the stator winding is composed of four parallel circuits. In this case, when the current applied to the main motor is I, the current that flows in each parallel circuit becomes I/4, and, when the winding resistance of each parallel circuit is R, the copper loss of each parallel circuit becomes $I^2R/16$. The copper loss is given by $(current)^2 \times (winding\ resistance)$. Therefore, the copper loss of the four parallel circuits becomes $I^2R/4$. On the other hand, when the stator winding is not composed of parallel circuits, because the magnitude of the current is I, it is necessary to set the winding resistance thereof to R/4 so that the copper loss is the same. Thus, it is necessary to increase the cross-sectional area of the wire (conductor) by a factor of four.

It is understood from the following description that when the stator winding is not composed of parallel circuits, it is necessary that the cross-sectional area of the wire (conductor) is four times the area in the case of the four parallel circuits. First, when it is assumed that the size of the main motor is the same, it is also necessary to set the magnetic flux density to be generated in the main motor to be approximately the same. Under the conditions that the frequency is constant, $V=-N \times d\phi/dt=-N \times j \times \omega \times \phi$ (V is the voltage, $\phi$ is the magnetic flux, N is the number of windings, $j=\sqrt{(-1)}$, $\omega=2\pi f$ (f is the frequency), and t is time) is satisfied; therefore, the magnetic flux density in the main motor is proportional to voltage/the number of wirings. When the stator winding is not composed of parallel circuits, the number of windings becomes ¼ compared with the case of the four parallel circuits; therefore, it is necessary to reduce the voltage to ¼ so as to make the magnetic flux density the same.

Next, an explanation will be made of the effectiveness of the use of parallel circuits under the conditions that the copper loss is the same. FIG. 1 is a diagram illustrating, by way of contrasting with each other, a case (a) where the stator winding is composed of four parallel circuits and a case (b) where the stator winding is not composed of parallel circuits. FIG. 1 illustrates, as an example, a coil 3 that is accommodated in one of slots 30 provided on the inner circumferential side of a stator core 2. The coil 3 is accommodated in the slot 30 such that the coil 3 has a two-layer structure. In other words, the coil 3 includes an upper coil 3*b* on the opening portion side of the slots 30 and a lower coil 3*a* on the bottom portion side of the slots 30. In FIG. 1(*a*), the upper coil 3*b* and the lower coil 3*a* are each composed of four wires so as to correspond to the four parallel circuits and these wires are denoted by the word "turn" together with the number 1 to 4 in FIG. 1(*a*). In FIG. 1(*b*), the upper coil 3*b* and the lower coil 3*a* are each composed of one wire so as to correspond to the configuration with no parallel circuit and, as described above, the cross-sectional area of the wire (conductor) is four times the area in the case of FIG. 1(*a*). With such configurations, in any of the configurations in FIGS. 1(*a*) and (*b*), the copper loss is the same and the magnetic flux densities are equal to each other.

However, as illustrated in FIG. 1(*b*), in the upper coil 3*b* on the opening portion side of the slots 30, the leakage flux from the lower coil 3*a* on the bottom portion side of the slots 30 interlinks (interlinkage magnetic flux 50) and a circulating current Ic is generated such that the interlinkage magnetic flux 50 is canceled in the wire (conductor) of the upper coil 3*b*. Therefore, there is a problem in that the efficiency of the main motor decreases due to the loss caused by the circulating current Ic. This is because the cross-sectional area of the wire (conductor) is larger than the case in FIG. 1(*a*).

In contrast, in FIG. 1(*a*), the cross-sectional area of each wire is 1/4 compared with the case in FIG. 1(*b*); therefore, even if the interlinkage magnetic flux 50 interlinks, the circulating current generated in each wire is reduced and thus the efficiency of the main motor can be maintained.

As described above, when the inverter circuit formed by using a wide bandgap semiconductor is used for the main motor, the copper loss can be reduced even when the current is large and the loss due to generation of a circulating current can be reduced by increasing the number of parallel circuits of the stator winding. For such reasons, in the present embodiment, the stator winding is composed of a plurality of parallel circuits.

Figure 2:
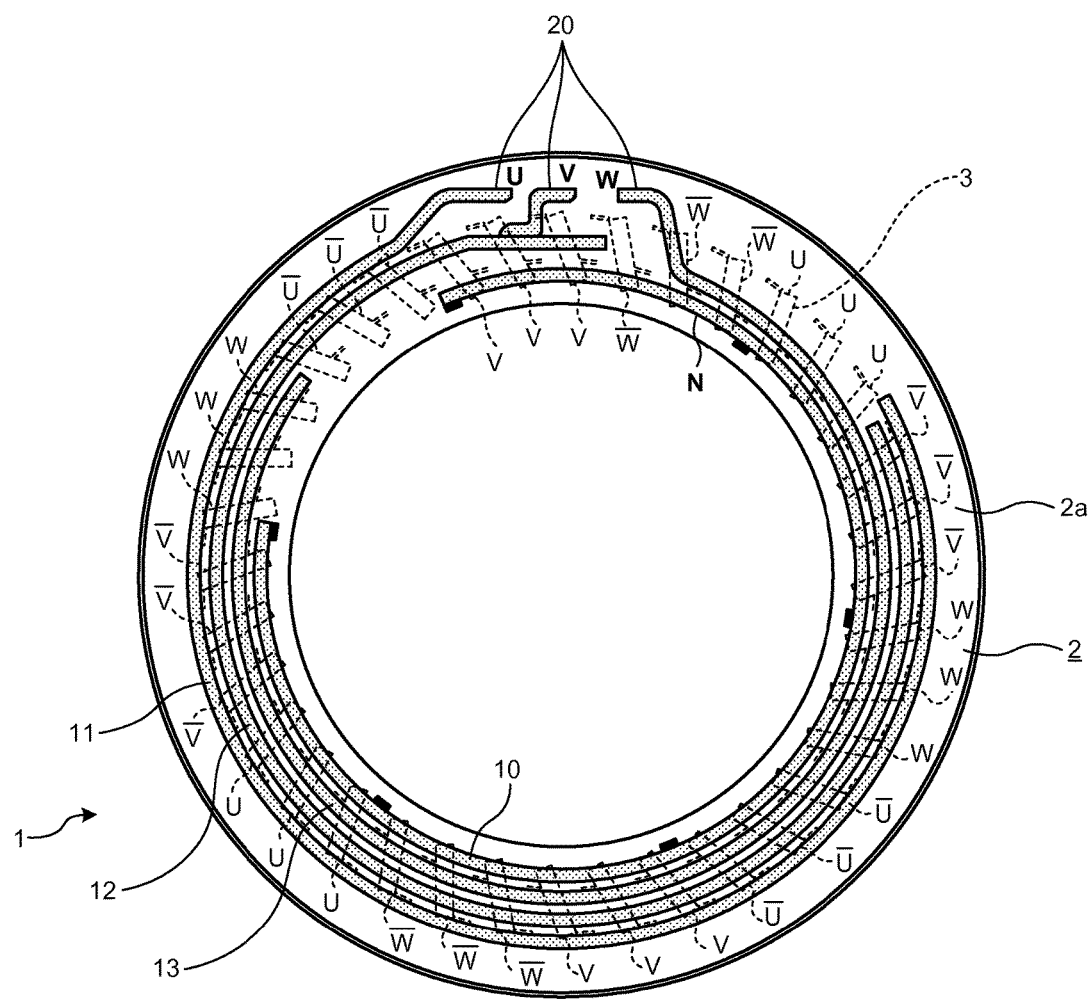
FIG. 2 is a diagram illustrating the configuration of an end portion of a main motor according to an embodiment.
Figure 3:
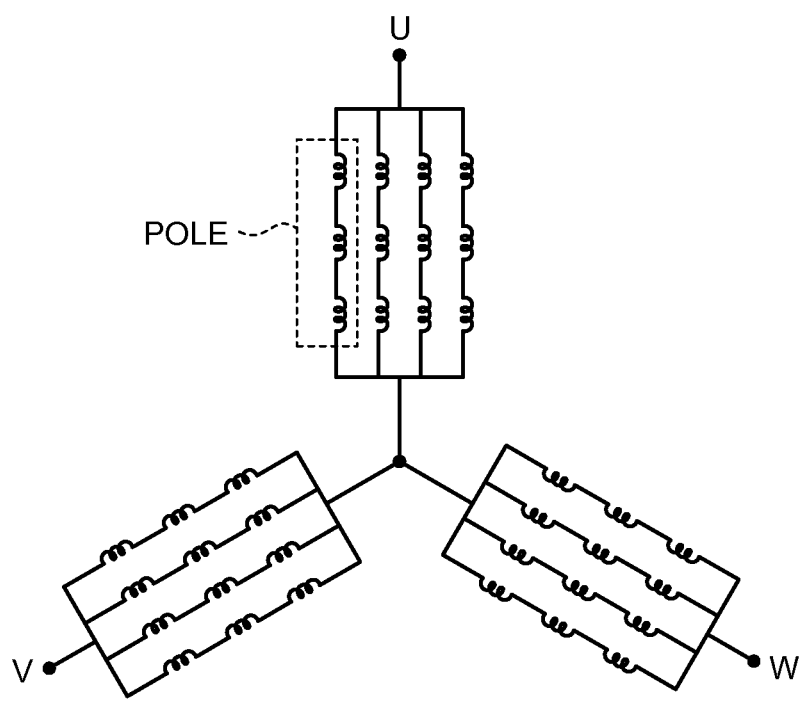
FIG. 3 is a circuit configuration diagram of the stator winding of the main motor according to the embodiment.
Figure 4:
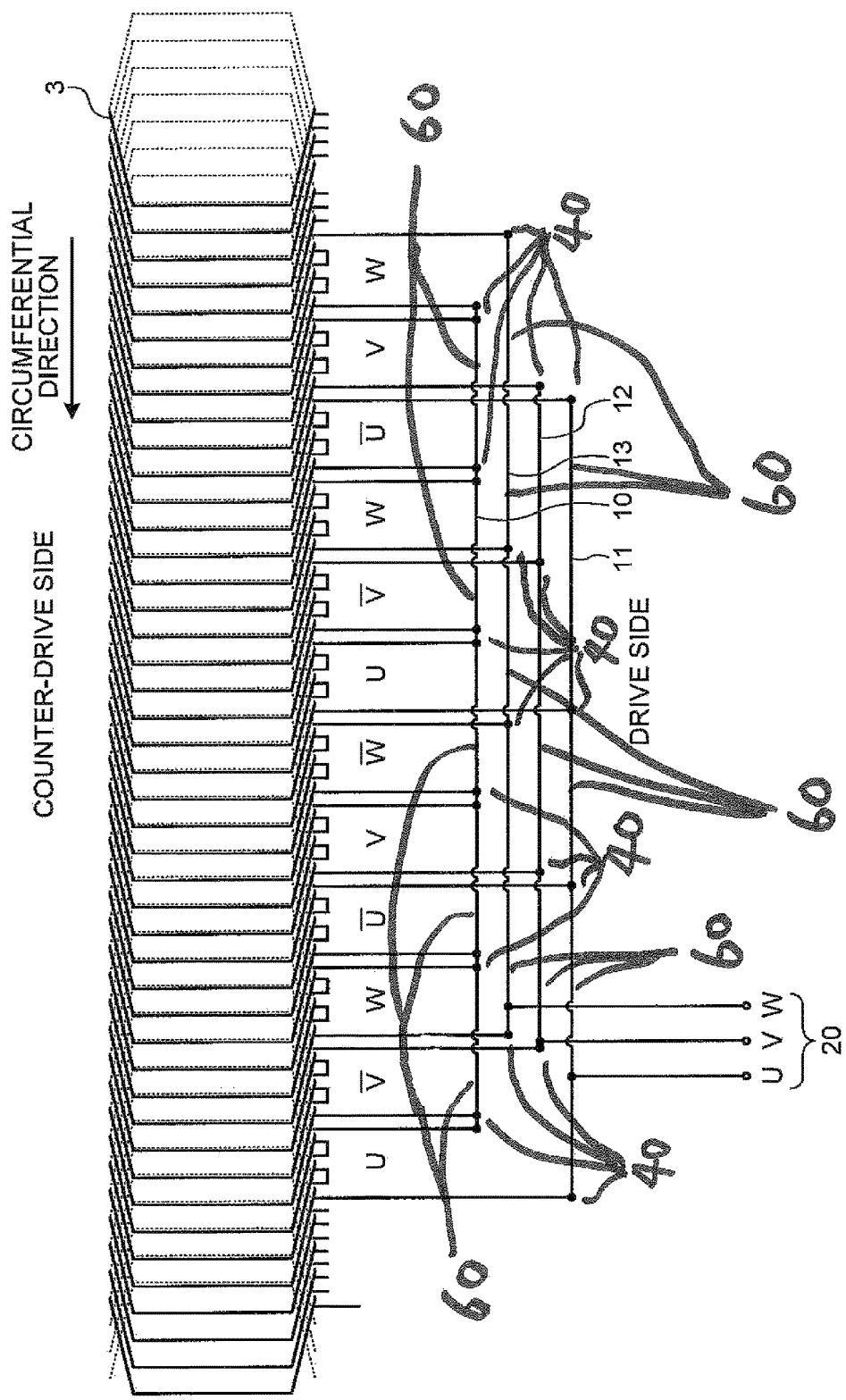
FIG. 4 is a connection diagram of the stator winding of the main motor according to the embodiment.

Next, an explanation will be made in detail of the relationship between the number of parallel circuits of the stator winding and the number of poles. FIG. 2 is a diagram illustrating the configuration of the end portion of the main motor according to the present embodiment and mainly illustrates the configuration of the stator. FIG. 3 is a circuit configuration diagram of the stator winding of the main motor according to the present embodiment. FIG. 4 is a connection diagram of the stator winding of the main motor according to the present embodiment.

As illustrated in FIG. 2, the stator of a main motor 1 includes the substantially annular stator core 2, the coils 3 that are mounted in the slots of the stator core 2, respectively, a circuit ring 11 (first circuit ring) that has a substantially C shape and is used for connecting U-phase wires, a circuit ring 12 (second circuit ring) that has a substantially C shape and is used for connecting V-phase wires, a circuit ring 13 (third circuit ring) that has a substantially C shape and is used for connecting W-phase wires, and a circuit ring 10 (fourth circuit ring) that has a substantially C shape and is used for connecting neutral points.

The slots provided in the stator core 2 are arranged at substantially equal intervals along the circumferential direction and the coils 3 are also arranged at substantially equal intervals along the circumferential direction corresponding to the slots. The form of accommodating the coil 3 in each slot is as illustrated in FIG. 1(*a*). Moreover, although not illustrated, a rotor is rotatably arranged on the inner circumferential side of the stator core 2 with a clearance from the stator core 2. The circuit rings 10 to 13 are arranged coaxially to one another. The circuit ring 10 is arranged, for example, on the innermost diameter side with respect to the circuit rings 11 to 13.

FIG. 2 illustrates a configuration example in which the number of poles is 4 and the number of parallel circuits of the stator winding is 4 when the number of slots is 36 for example. In this manner, in the present embodiment, the number of parallel circuits of the stator winding is equal to the number of poles. In this case, the number of slots of each pole of each phase is (total number of slots)/(number of phases×number of poles)=36/(3×4)=3. Correspondingly, in FIG. 2, a set of the coils 3 in three circumferentially continuous slots forms a pole. Specifically, each set of three coils 3 represented by U, V bar, W, U bar, V, W bar, U, V bar, W, U bar, V, or W bar forms a pole in accordance with each phase. Therefore, for example, with respect to the U phase, a set of the coils 3 in three continuous slots represented by U and a set of the coils 3 in three continuous slots represented by U bar are arranged alternately and at substantially equal intervals in the circumferential direction and appear at four locations in total, and they each form a pole. U bar indicates that the winding direction of the coils 3 is opposite to U. Moreover, these four poles form parallel circuits (see FIG. 3). In other words, as illustrated in FIG. 3, a pole corresponds to a parallel circuit; therefore, the coils 3 in three circumferentially continuous slots form a pole and also form one of the four parallels. In the present embodiment, the parallel circuits are arranged at substantially equal intervals in the circumferential direction corresponding to the positions of the poles; therefore, they are arranged in a distributed manner in the circumferential direction. The same is applied to the V phase and the W phase.

The circuit ring 10 is a joint bar used for a three-phase star connection (see FIG. 3). The circuit ring 10 is obtained by forming an insulating coating (insulating coating portions 60) on a substantially C-shaped plate-like metal member except for the wire connection portions (uninsulated wire connection portions 40). The circuit ring 10 extends in the circumferential direction of the stator core 2 so that the circuit ring 10 can be connected to the end portions of the wires of the coils 3. As described above, the parallel circuits are arranged in a distributed manner in the circumferential direction; therefore, the end portions of the coils 3 forming the parallel circuits are also arranged in a distributed manner. Thus, with the use of the circuit ring 10 that extends in the circumferential direction, the end portions of the coils 3 can be connected to the circuit ring 10 at the positions of the end portions without routing the wires of the coils 3 that form the parallel circuits. In this manner, the circuit ring 10 enables a collective wire connection in a state where the wire connection portions are distributed in the circumferential direction. At the wire connection portions, an insulating coating is not formed on the circuit ring 10; therefore, a wire connection is made such that the metal member in the circuit ring 10 is in contact with the end portions of the wires of the coils 3. As illustrated in FIG. 4, the number of wire connection portions in this case is 4 for each phase and is 12 in total. FIG. 4 also highlights the location of the four wire connection portions 5 for the U-phase. FIG. 4 schematically illustrates the wire connection structure of the parallel circuits of the respective phases and the circuit rings 10 to 13 with respect to the coils 3 arranged in the circumferential direction (the solid lines indicate the lower coils 3a and the dotted lines indicate the upper coils 3b).

The circuit ring 11 is a joint bar used for a U-phase connection (see FIG. 3). The circuit ring 11 is obtained by forming an insulating coating (insulating coating portions 60) on a substantially C-shaped plate-like metal member except for the wire connection portions (uninsulated wire connection portions 40). The circuit ring 11 extends in the circumferential direction of the stator core 2 so that the circuit ring 11 can be connected to the end portions of the wires of the coils 3. As described above, the parallel circuits are arranged in a distributed manner in the circumferential direction; therefore, the end portions of the coils 3 forming the parallel circuits are also arranged in a distributed manner. Thus, with the use of the circuit ring 11 that extends in the circumferential direction, the end portions of the coils 3 can be connected to the circuit ring 11 at the positions of the end portions without routing the wires of the coils 3 that form the parallel circuits. In this manner, the circuit ring 11 enables a collective wire connection in a state where the wire connection portions are distributed in the circumferential direction. At the wire connection portions, an insulating coating is not formed on the circuit ring 11; therefore, a wire connection is made such that the metal member in the circuit ring 11 is in contact with the end portions of the wires of the coils 3. As illustrated in FIG. 4, the number of wire connection portions in this case is four. The circuit rings 12 and 13 are similar to the circuit ring 11.

Moreover, each of the circuit rings 10 to 13 is, for example, formed in a substantially C shape; therefore, the gap between the opposing end portions of each circuit ring can be used, for example, for drawing out the wires. For example, one end portion of the circuit ring 12 is drawn out to the outside diameter side through the gap between the opposing end portions of the circuit ring 11 and is connected to a lead wire 20.

Next, an explanation will be given for the reason why the number of poles and the number of parallel circuits are made equal to each other. In order to explain the reason, in the following, an explanation will be made in sequence of a case where the number of parallel circuits is larger than the number of poles and a case where the number of parallel circuits is smaller than the number of poles so as to compare with a case where the number of poles and the number of parallel circuits are made equal to each other.

First, an explanation will be made of the case where the number of parallel circuits is larger than the number of poles. In the following, for example, a case with four poles and five parallels is explained. When the number of parallel circuits is larger than the number of poles, it is difficult to form a parallel circuit for each pole as in the case where the number of poles is equal to the number of parallel circuits. Therefore, in order to realize five parallels, the number of slots of each pole of each phase is set to the same number as the number of parallel circuits, i.e., five, and each parallel circuit is formed over the poles. The total number of slots in this case is 3×5×4=60.

Figure 5:
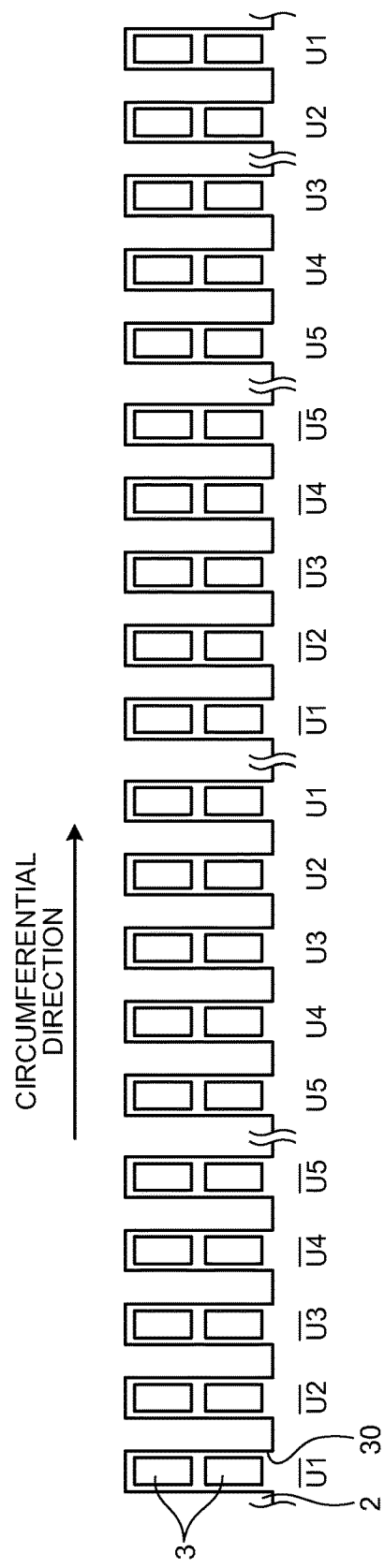
FIG. 5 is a schematic diagram for explaining the configuration of four poles and five parallels.

The explanation for the above is specifically made with reference to FIG. 5. FIG. 5 is a schematic diagram for explaining the configuration of the four poles and five parallels and illustrates the U phase as an example. FIG. 5 illustrates a state where five coils 3 represented in sequence by U1 bar to U5 bar, five coils 3 represented in sequence by U5 to U1, five coils 3 represented in sequence by U1 bar to U5 bar, and five coils 3 represented in sequence by U5 to U1 are arranged in the circumferential direction. The five coils 3 represented in sequence by U1 bar to U5 bar are accommodated in five circumferentially continuous slots and form one pole. The five coils 3 represented in sequence by U5 to U1 are accommodated in five circumferentially continuous slots and form one pole. Therefore, in FIG. 5, four poles are formed in total. The same is applied to the V phase and the W phase.

Moreover, a parallel circuit in this case is formed by connecting the coils 3 represented by the same parallel circuit number (the number that is attached to U or U bar and is used for distinguishing between parallel circuits) in series. Specifically, in FIG. 5, for example, the circuit circumferentially connecting U1 bar, U1, U1 bar, and U1 forms one of the parallel circuits ("1" is the parallel circuit number), the circuit circumferentially connecting U2 bar, U2, U2 bar, and U2 forms one of the parallel circuits ("2" is the parallel circuit number), and the circuit circumferentially connecting U3 bar, U3, U3 bar, and U3 forms one of the parallel circuits ("3" is the parallel circuit number); therefore, five parallel circuits are formed in total. The same is applied to the V phase and the W phase.

Figure 8:
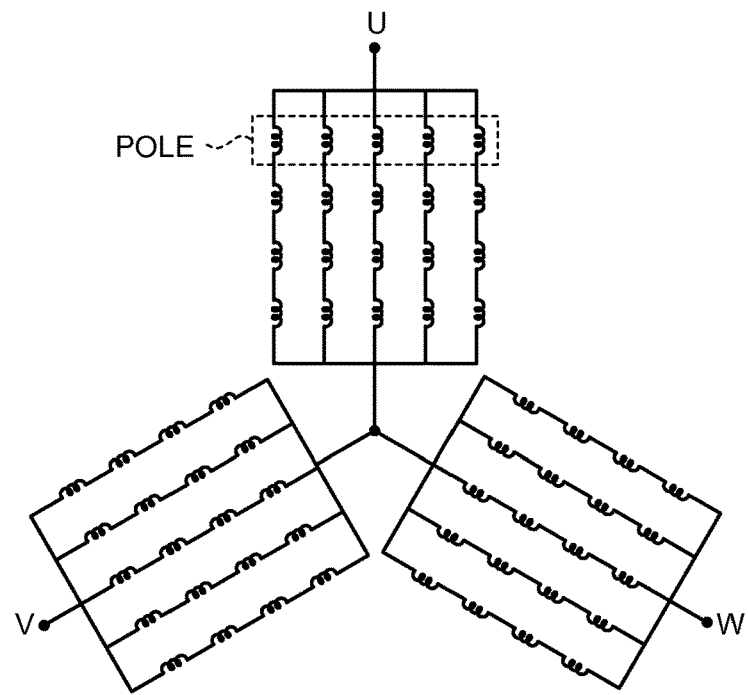
FIG. 8 is a diagram illustrating the circuit configuration in the case of the four poles and five parallels.

Moreover, the relationship between the poles and the parallel circuits explained with reference to FIG. 5 can be specifically seen from the circuit configuration in FIG. 8. FIG. 8 illustrates the circuit configuration in the case of the four poles and five parallels described above. As illustrated in FIG. 8, each pole is formed over the parallel circuits.

As illustrated in FIG. 5, in which U1 bar to U5 bar, U5 to U1, U1 bar to U5 bar, and U5 to U1 are circumferentially arranged in order as they appear in this sentence, the arranging order of the parallel circuits is reversed at every pole. This is because a phase difference occurs in one pole among U1 bar or U5 bar or among U5 to U1 and the phase differences are canceled by each other between the poles by causing the arranging orders of the parallel circuits in adjacent poles opposite to each other, whereby a phase difference is prevented from occurring between the parallel circuits.

Figure 6:
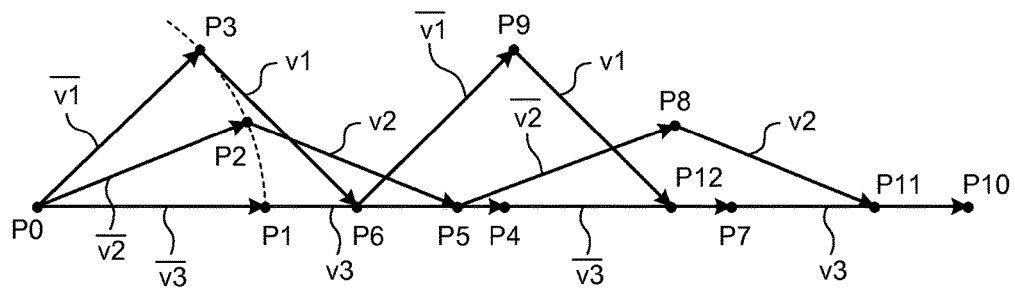
FIG. 6 is a diagram illustrating for each parallel circuit number the magnitude of the induced voltages generated in parallel circuit by vectors in the case of the four poles and five parallels.

However, a phase difference among U1 bar to U5 bar or among U5 to U1 causes a variation in the magnitude of the induced voltage among the parallel circuits. This is specifically explained with reference to FIG. 6. FIG. 6 is a diagram illustrating for each parallel circuit number the magnitude of the induced voltage generated in the parallel circuit by vectors in the case of the four poles and five parallels. For example, the U phase is explained below as an example in a similar manner to FIG. 5. In FIG. 6, v1 represents the induced voltage generated in U1 in FIG. 5, v1 bar represents the induced voltage generated in U1 bar in FIG. 5, v2 represents the induced voltage generated in U2 in FIG. 5, v2 bar represents the induced voltage generated in U2 bar in FIG. 5, v3 represents the induced voltage generated in U3 in FIG. 5, and v3 bar represents the induced voltage generated in U3 bar in FIG. 5. A phase difference is determined with reference to the phases of U3 and U3 bar. The phases of v1 and v1 bar are opposite to each other, the phases of v2 and v2 bar are opposite to each other, and the phases of v3 and v3 bar are equal to each other. In this case, the vectors from P0 to P10 indicate the sum of the induced voltages for four poles in the parallel circuit of the parallel circuit number 3, the vectors from P0 to P11 indicate the sum of the induced voltages for four poles in the parallel circuit of the parallel circuit number 2, and the vectors from P0 to P12 indicate the sum of the induced voltages for four poles in the parallel circuit of the parallel circuit number 1. In other words, although there is no phase difference in the sum of the induced voltages, the magnitudes of the sums of the induced voltages are different from each other. Although not illustrated, the vectors from P0 to P11 indicate the sum of the induced voltages for four poles in the parallel circuit of the parallel circuit number 4 and the vectors from P0 to P12 indicate the sum of the induced voltages for four poles in the parallel circuit of the parallel circuit number 5.

As described above, in the configuration of the four poles and five parallels, a difference occurs in the induced voltage between the parallel circuits; therefore, a circulating current flows between the parallel circuits so as to average this induced voltage difference. Consequently, the efficiency of the main motor 1 degrades. In other words, when the number of parallel circuits is larger than the number of poles, there is a problem in that the efficiency of the motor decreases due to the circulating current flowing between the parallel circuits.

Next, an explanation will be made of the case where the number of parallel circuits is smaller than the number of poles. This case is explained by separately explaining a case where the number of poles/the number of parallel circuits is not an integer and a case where the number of poles/the number of parallel circuits is an integer.

Figure 9:
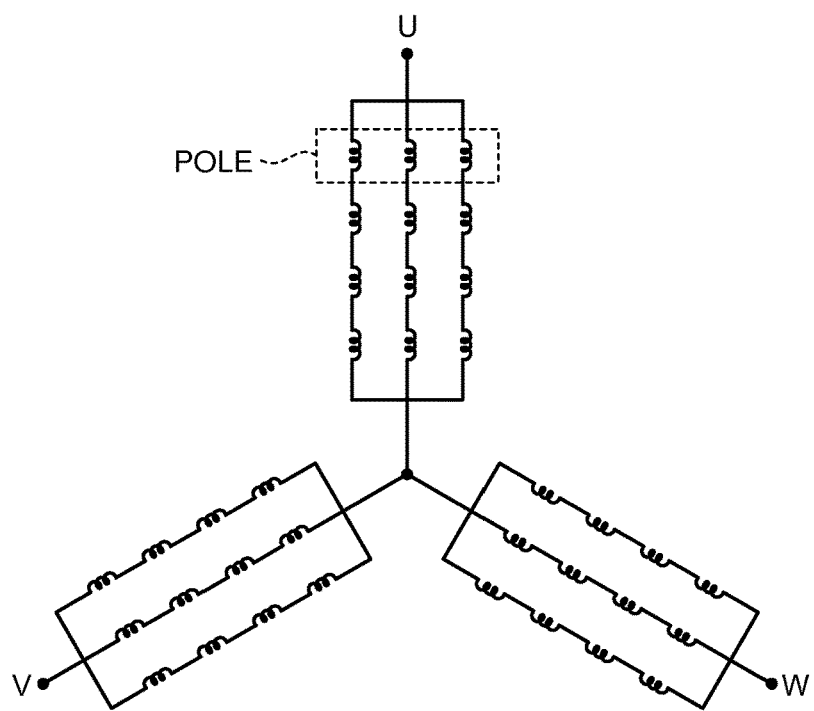
FIG. 9 is a diagram illustrating the circuit configuration in the case of four poles and three parallels.

First, an explanation will be made of the case where the number of poles/the number of parallel circuits is not an integer. In this case, in a similar manner to the case where the number of parallel circuits is larger than the number of poles, a difference occurs in the induced voltage between the parallel circuits and a circulating current flows. Therefore, there is a problem in that the efficiency of the motor decreases. FIG. 9 illustrates the circuit configuration in the case of four poles and three parallels. As illustrated in FIG. 9, each pole is formed over the parallel circuits.

Figure 7:
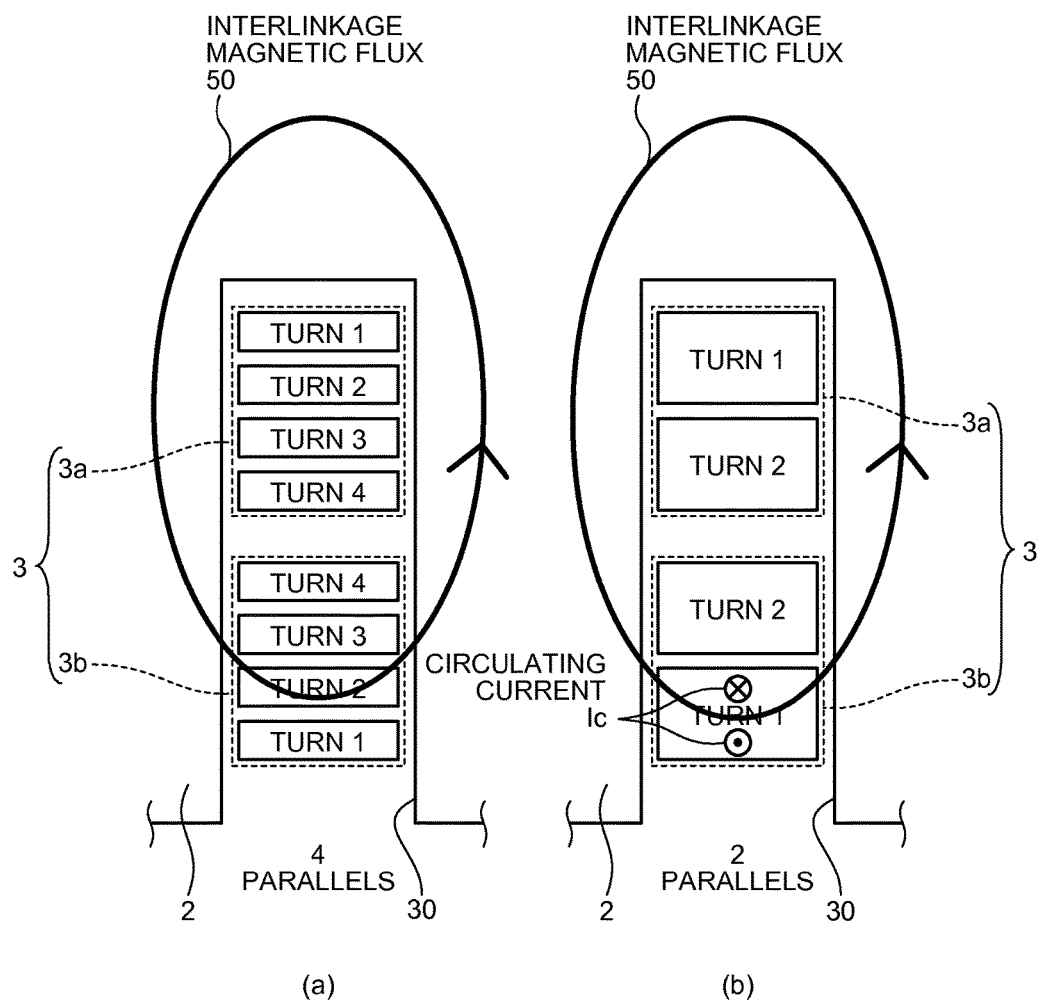
FIG. 7 is a diagram illustrating, by way of contrasting with each other, a case (a) where the stator winding is composed of four parallel circuits and a case (b) where the stator winding is composed of two parallel circuits.

Next, an explanation will be made of the case where the number of poles/the number of parallel circuits is an integer. In the following, for example, the configuration of four poles and two parallels will be explained. FIG. 7 is a diagram illustrating, by way of contrasting with each other, a case (a) where the stator winding is composed of four parallel circuits and a case (b) where the stator winding is composed of two parallel circuits. FIG. 7(a) is the same as FIG. 1(a); therefore, an explanation thereof is omitted. In FIG. 7(b), the upper coil 3b and the lower coil 3a correspond to the configuration in which the number of parallel circuits is two and are each composed of two wires. The upper coil 3b and the lower coil 3a are denoted by the word "turn" together with the numbers 1 to 2 in FIG. 7(b). As explained in FIG. 1, in order to make the copper loss the same, the cross-sectional area of the wires (conductors) is twice the area of the case of FIG. 7(a). In FIG. 7, the components that are the same as those in FIG. 1 are denoted by the same reference numerals.

In FIG. 7(b), in the upper coil 3b on the opening portion side of the slots 30, the leakage flux from the lower coil 3a on the bottom portion side of the slots 30 interlinks (interlinkage magnetic flux 50) and a circulating current Ic is generated such that the interlinkage magnetic flux 50 is canceled in the wire (conductor) of the upper coil 3b. Therefore, there is a problem in that the efficiency of the main motor 1 decreases due to the loss caused by the circulating current Ic.

As described above, with the configuration of the four poles and two parallels, it is necessary to increase the cross-sectional area of the wires (conductors) in order to make the copper loss the same; therefore, there is a problem in that the circulating current flowing in the wires (conductors) tends to become noticeable and the efficiency of the motor decreases. Particularly, when a high-frequency current is caused to flow during a high-speed operation, the loss due to the circulating current becomes noticeable. In other words, when the number of parallel circuits is smaller than the number of poles and the number of poles/the number of parallel circuits is an integer, there is a problem in that the efficiency of the motor decreases due to the loss caused by the circulating current.

As a method of preventing this problem, it is possible to perform the Roebel transposition on the stator winding. However, when the Roebel transposition is performed, it is necessary to twist the wires 180° or more in the axial direction in order to cancel the circulating current; therefore, there is a problem in that the workability degrades.

As is apparent from the contrasting explanation described above, when the number of poles is made equal to the number of parallel circuits, the circulating current between the parallel circuits and in the wires is reduced; therefore, the efficiency of the main motor 1 can be improved.

FIG. 2 to FIG. 4 illustrate the case of the four poles and four parallels as an example; however, the present embodiment is not limited to this and, typically, the present embodiment can be such that the number of parallel circuits of the stator winding=the number of poles=n is satisfied, where n is a positive even number. For example, when the number of poles of each pole of each phase is three, it is satisfactory that the number of slots is set to 6×3×3=54 to form six poles and six parallels. For example, it is satisfactory that the number of slots is set to 8×3×3=72 to form eight poles and eight parallels.

When the number of poles is two, there is a problem in that a core back 2a (see FIG. 2) of the stator core 2 increases in size and the coil end portions become long; therefore, generally, this configuration is not used in the main motors for railway vehicles. In other words, considering the fact that the main motor is mounted on an electric vehicle in which the installation space is limited, it is preferable that the number of poles is four or six.

Moreover, in the present embodiment, the number of slots of each pole of each phase is three, for example; however, it is typically preferable that the number of slots of each pole of each phase is set to an integer equal to or larger than three. This is because if the number of slots of each pole of each phase is smaller than three, spatial harmonics (harmonics generated in the main motor) increase and thus the losses increase.

Effects of the present embodiment will be explained here. First, in the present embodiment, the inverter circuit that includes the switching elements formed by using a wide bandgap semiconductor is used for the main motor 1, and in at least part of the speed range of an electric vehicle, the voltage to be output to the main motor 1 from the inverter circuit is formed into a PWM waveform. This enables the switching loss of the inverter circuit to be reduced in a similar manner to a one-pulse mode while taking advantage of the PWM control to reduce harmonics. According to the present embodiment, it is possible to replace at least part of the speed range in which a one-pulse mode has been used with the PWM control; therefore, the one-pulse operation speed range can be reduced.

In the present embodiment, due to the application of the inverter circuit described above, the specification of the main motor 1 is such that a current is large and a voltage is low; however, generation of a circulating current in the wires (conductors) can be suppressed while reducing the copper loss in the main motor 1 by having the stator winding composed of parallel circuits.

In the present embodiment, the number of parallel circuits of the stator winding is made equal to the number of poles; therefore, in contrast to the case where the number of parallel circuits is larger than the number of poles, a circulating current does not flow between the parallel circuits and thus the efficiency of the main motor 1 does not decrease. Moreover, in the present embodiment, the number of parallel circuits of the stator winding is made equal to the number of poles; therefore, in contrast to the case where the number of parallel circuits is smaller than the number of poles and the number of poles/the number of parallel circuits is not an integer, a circulating current does not flow between the parallel circuits and thus the efficiency of the main motor 1 does not decrease. Furthermore, in the present embodiment, the number of parallel circuits of the stator winding is made equal to the number of poles; therefore, in contrast to the case where the number of parallel circuits is smaller than the number of poles and the number of poles/the number of parallel circuits is an integer, a circulating current does not flow in the wires and thus the efficiency of the main motor 1 does not decrease. Moreover, there is no problem in that the workability degrades by performing the Roebel transposition to cancel the circulating current.

In the present embodiment, a wire connection in each phase of the stator winding is collectively performed by using a corresponding one of the circuit rings 11 to 13 and the neutral points are collectively connected by using the circuit ring 10. Accordingly, the end portions of the coils 3 can be connected to the circuit rings 10 to 13 at the positions of the end portions; therefore, it is not necessary to extend and route the wires of the coils 3 to the positions of the lead wires 20. Thus, the wire connection is easily performed and the workability is improved. Moreover, each of the circuit rings 10 to 13 is insulated; therefore, the workability is improved compared with the case where it is necessary to insulate each wire as in the case where the wires are drawn out long.

In conventional main motors for railway vehicles, wires are used in order to perform a wire connection of each phase of the stator winding and a wire connection of the neutral points. In contrast, the present embodiment uses a configuration that is not used in conventional main motors for railway vehicles, i.e., the configuration in which the number of parallel circuits of the stator winding is made equal to the number of poles; therefore, the parallel circuits are circumferentially distributed and thus it is preferable to use the circuit rings 10 to 13.

INDUSTRIAL APPLICABILITY

The present invention is preferable as a main motor for a railway vehicle.

REFERENCE SIGNS LIST 1 main motor
2 stator core
2a core back
3 coil
3a lower coil
3b upper coil
5 wire connection portions for U-phase
10 to 13 circuit ring
20 lead wire
30 slot

The invention claimed is:
1. A three-phase AC main motor for a railway vehicle that is mounted on an electric vehicle and is used for driving the electric vehicle, is rotationally driven upon receiving an AC power supplied from an inverter circuit that includes a switching element, and is driven by having a voltage having a PWM waveform applied from the inverter circuit in at least part of a speed range of the electric vehicle, the main motor comprising:
   a stator that is configured to include an annular stator core provided with a plurality of slots in a circumferential direction and a stator winding that includes U-phase coils, V-phase coils, and W-phase coils that are wound on the stator core and are accommodated in the slots, and that is three-phase star-connected and is composed of parallel circuits, a number of which is the same as the number of poles for each phase, wherein the number of poles is an even number equal to or greater than four and the number of parallel circuits is an even number equal to or greater than four, each of the U-phase coils, the V-phase coils configuring the parallel circuits of a corresponding phase;
   a rotor that is arranged on an inner side of the stator core;
   a first circuit ring that is provided to the stator core along the circumferential direction, that has a substantially C shape, and that is a plate-like metal member including a plurality of insulating coating portions and a plurality of uninsulated wire connection portions provided at positions corresponding to the U-phase coils, the parallel circuits configured from the U-phase coils being connected to the uninsulated wire connection portions;

a second circuit ring that is provided to the stator core along the circumferential direction, that has a substantially C shape, and that is a plate-like metal member including a plurality of insulating coating portions and a plurality of uninsulated wire connection portions provided at positions corresponding to the V-phase coils, the parallel circuits configured from the V-phase coils being connected to the uninsulated wire connection portions;

a third circuit ring that is provided to the stator core along the circumferential direction, that has a substantially C shape, and that is a plate-like metal member including a plurality of insulating coating portions and a plurality of uninsulated wire connection portions provided at positions corresponding to the W-phase coils, the parallel circuits configured from the W-phase coils being connected to the uninsulated wire connection portions; and a fourth circuit ring that is provided to the stator core along the circumferential direction, that has a substantially C shape, that is a plate-like metal member including a plurality of insulating coating portions and a plurality of uninsulated wire connection portions provided at positions corresponding to the U-phase coils, the V-phase coils, and the W-phase coils, and that is used for a neutral-point connection of the stator winding, the parallel circuits configured from the U-phase coils, the parallel circuits configured from the V-phase coils, and the parallel circuits configured from the W-phase coils being connected to the uninsulated wire connection portions, wherein the first circuit ring, the second circuit ring, and the third circuit ring are coaxial to each other, wherein one end portion of an inner circuit ring among the first circuit ring, the second circuit ring, and the third circuit ring protrudes beyond an exterior circuit ring among the first circuit ring, the second circuit ring, and the third circuit ring through a gap between opposing end portions of the exterior circuit ring, wherein the one end portion of the inner circuit ring is directly connected to a lead wire, wherein the first circuit ring, the second circuit ring, the third circuit ring, and the fourth circuit ring are successively arranged in a radially inward direction of the stator core, starting with the first circuit ring and followed by the second circuit ring, the third circuit ring, and then the fourth circuit ring, wherein one end portion of the second circuit ring to which a lead wire is directly connected is located between one end portion of the first circuit ring to which a lead wire is directly connected and one end portion of the third circuit ring to which a lead wire is directly connected, each of the end portions of the second circuit ring, the first circuit ring, and the third circuit ring extend circumferentially, and wherein the insulating coating portions of each of the first to fourth circuit rings are separated from the insulating coating portions of each of the other circuit rings among the first to fourth circuit rings.

2. The main motor for a railway vehicle according to claim 1, wherein the number of poles is four or six.

3. The main motor for a railway vehicle according to claim 1, wherein the switching element is formed by using a wide bandgap semiconductor.

4. The main motor for a railway vehicle according to claim 1, wherein each coil is located completely within one slot.

5. The main motor for a railway vehicle according to claim 1, wherein the stator winding has a four-pole, four-parallel-circuit configuration.

6. The main motor for a railway vehicle according to claim 1, wherein the stator winding has a six-pole, six-parallel-circuit configuration.

7. The main motor for a railway vehicle according to claim 1, wherein in each of the phases, the coils of the poles adjacent to each other in the circumferential direction are wound in opposite directions to each other.

8. The main motor for a railway vehicle according to claim 1, wherein in each of the phases, the coils of the parallel circuits in any one of the poles are arranged in reverse order to the coils of the parallel circuits in the pole adjacent to the any one of the poles in the circumferential direction.

* * * * *